(12) United States Patent
Cho et al.

(10) Patent No.: US 12,058,484 B2
(45) Date of Patent: Aug. 6, 2024

(54) ELECTRONIC DEVICE INCLUDING SPEAKER MODULE

(71) Applicant: SAMSUNG ELECTRONICS CO., LTD., Suwon-si (KR)

(72) Inventors: Sungjoo Cho, Suwon-si (KR); Daeyoung Noh, Suwon-si (KR); Kwonho Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 17/943,670

(22) Filed: Sep. 13, 2022

(65) Prior Publication Data

US 2023/0053093 A1    Feb. 16, 2023

Related U.S. Application Data

(63) Continuation of application No. PCT/KR2022/011829, filed on Aug. 9, 2022.

(30) Foreign Application Priority Data

Aug. 10, 2021   (KR) .................. 10-2021-0105168

(51) Int. Cl.
*H04R 1/02*   (2006.01)
*G03B 17/56*  (2021.01)

(52) U.S. Cl.
CPC ............ *H04R 1/028* (2013.01); *G03B 17/56* (2013.01)

(58) Field of Classification Search
None
See application file for complete search history.

(56) References Cited

U.S. PATENT DOCUMENTS

| | | |
|---|---|---|
| 9,800,963 B1 | 10/2017 | Liu et al. |
| 10,979,794 B2 | 4/2021 | Park et al. |

(Continued)

FOREIGN PATENT DOCUMENTS

| | | | |
|---|---|---|---|
| CN | 105721636 A | * | 6/2016 |
| CN | 110113460 | | 8/2019 |

(Continued)

OTHER PUBLICATIONS

Search Report and Written Opinion dated Nov. 10, 2022 issued in International Patent Application No. PCT/KR2022/011829.

*Primary Examiner* — Rodney E Fuller
(74) *Attorney, Agent, or Firm* — Nixon & Vanderhye, P.C.

(57) ABSTRACT

An electronic device according to various embodiments may include: a camera module including a camera; a speaker module including a speaker disposed in a first direction with respect to the camera module; a first support including a speaker support configured to support the speaker module and a camera support configured to support the camera module; a second support having at least a portion coupled to the first support; a sound hole connected to an outside of the electronic device; a first sound outlet positioned in the first direction with respect to the camera module and connected to the sound hole; a second sound outlet positioned in a second direction opposite to the first direction with respect to the camera module and connected to the sound hole; a first sound channel configured to connect the speaker module and the first sound outlet; and a second sound channel configured to connect the speaker module and the second sound outlet, wherein the second sound channel may include a space provided between the camera support of the first support and the second support.

20 Claims, 16 Drawing Sheets

(56) References Cited

U.S. PATENT DOCUMENTS

| | | |
|---|---|---|
| 11,218,582 B2 | 1/2022 | Hwang et al. |
| 2005/0233781 A1 | 10/2005 | Erixon et al. |
| 2009/0264156 A1 | 10/2009 | Burghardt et al. |
| 2018/0139389 A1 | 5/2018 | Park et al. |
| 2020/0252706 A1 | 8/2020 | Yin et al. |
| 2021/0006876 A1 | 1/2021 | Moon et al. |
| 2021/0044688 A1 | 2/2021 | Rusconi Clerici Beltrami et al. |
| 2021/0243519 A1 | 8/2021 | Kim et al. |
| 2021/0337055 A1 | 10/2021 | Lee et al. |

FOREIGN PATENT DOCUMENTS

| | | | | |
|---|---|---|---|---|
| CN | 111182399 A | * | 5/2020 | |
| CN | 112653780 A | * | 4/2021 | ............ H04M 1/026 |
| CN | 112887459 A | * | 6/2021 | ............ H04M 1/026 |
| CN | 216700051 U | * | 6/2022 | |
| EP | 1379101 | | 11/2009 | |
| EP | 4089988 | | 11/2022 | |
| KR | 10-2018-0053180 | | 5/2018 | |
| KR | 10-2018-0092155 | | 8/2018 | |
| KR | 10-2020-0085069 | | 7/2020 | |
| KR | 10-2021-0003538 | | 1/2021 | |
| WO | 2020/156207 | | 8/2020 | |

\* cited by examiner

ELECTRONIC DEVICE INCLUDING SPEAKER MODULE

CROSS-REFERENCE TO RELATED APPLICATIONS

This application is a continuation of International Application No. PCT/KR2022/011829 designating the United States, filed on Aug. 9, 2022, in the Korean Intellectual Property Receiving Office and claiming priority to Korean Patent Application No. 10-2021-0105168, filed on Aug. 10, 2021, in the Korean Intellectual Property Office, the disclosures of which are incorporated by reference herein in their entireties.

BACKGROUND

Field

The disclosure relates to an electronic device including a speaker module.

Description of Related Art

A speaker module including a speaker unit for reproducing a sound may be included in an electronic device. As more and more contents are reproduced through electronic devices, users' interest in sound performance is gradually increasing.

In consideration of convenience of assembly of the electronic device, the speaker unit is produced in the form of a speaker module.

A sound hole for emitting a sound output from the speaker module to the outside of the electronic device may be designed at a position aligned with the center of the electronic device in consideration of design factors.

The speaker module may be disposed at an eccentric position with respect to the center of the electronic device due to various factors. For example, in order to avoid interference with a camera module disposed at the center of the electronic device, the speaker module may be disposed eccentrically with respect to the center of the electronic device.

When the speaker module is eccentrically positioned at the center of the electronic device and a sound hole for outputting the sound of the speaker module to the outside of the electronic device is aligned at the center of the electronic device, a distance between each part of the sound hole and the speaker module may vary. That is, a certain portion of the sound hole may be adjacent to the speaker module, and another portion thereof may be relatively far from the speaker module.

In such a structure, when the speaker module and the sound hole are connected, a difference in a volume of a sound output from a portion of the sound hole adjacent to the speaker module and a volume of a sound output from a portion relatively far from the speaker module may occur. A deviation in the sound volume output through the sound hole may impair a sound performance of the electronic device.

SUMMARY

According to various example embodiments of the disclosure, an electronic device may include: a camera module including a camera; a speaker module including a speaker disposed in a first direction with respect to the camera module; a first support including a speaker support configured to support the speaker module and a camera support configured to support the camera module; a second support having at least a portion coupled to the first support; a sound hole connected to an outside of the electronic device; a first sound outlet positioned in the first direction with respect to the camera module and connected to the sound hole; a second sound outlet positioned in a second direction opposite to the first direction with respect to the camera module and connected to the sound hole; a first sound channel configured to connect the speaker module and the first sound outlet; and a second sound channel configured to connect the speaker module and the second sound outlet, wherein the second sound channel may include a space provided between the camera support of the first support and the second support.

According to various example embodiments of the disclosure, an electronic device may include: an interface including a socket configured to be connected with an external electronic device; a speaker module including a speaker disposed in a first direction with respect to the interface; a first support including a speaker support configured to support the speaker module and an interface support configured to support the interface; a second support having at least a portion coupled to the first support; a sound hole connected to an outside of the electronic device; a first sound outlet positioned in the first direction with respect to the interface and connected to the sound hole; a second sound outlet positioned in a second direction opposite to the first direction with respect to the interface and connected to the sound hole; a first sound channel configured to connect the speaker module and the first sound outlet; and a second sound channel configured to connect the speaker module and the second sound outlet, wherein the second sound channel may include a space provided between the interface support of the first support and the second support.

According to various example embodiments, a deviation in a sound volume output from a sound hole connected to a speaker module can be reduced. Accordingly, a sound performance of the electronic device can be improved.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
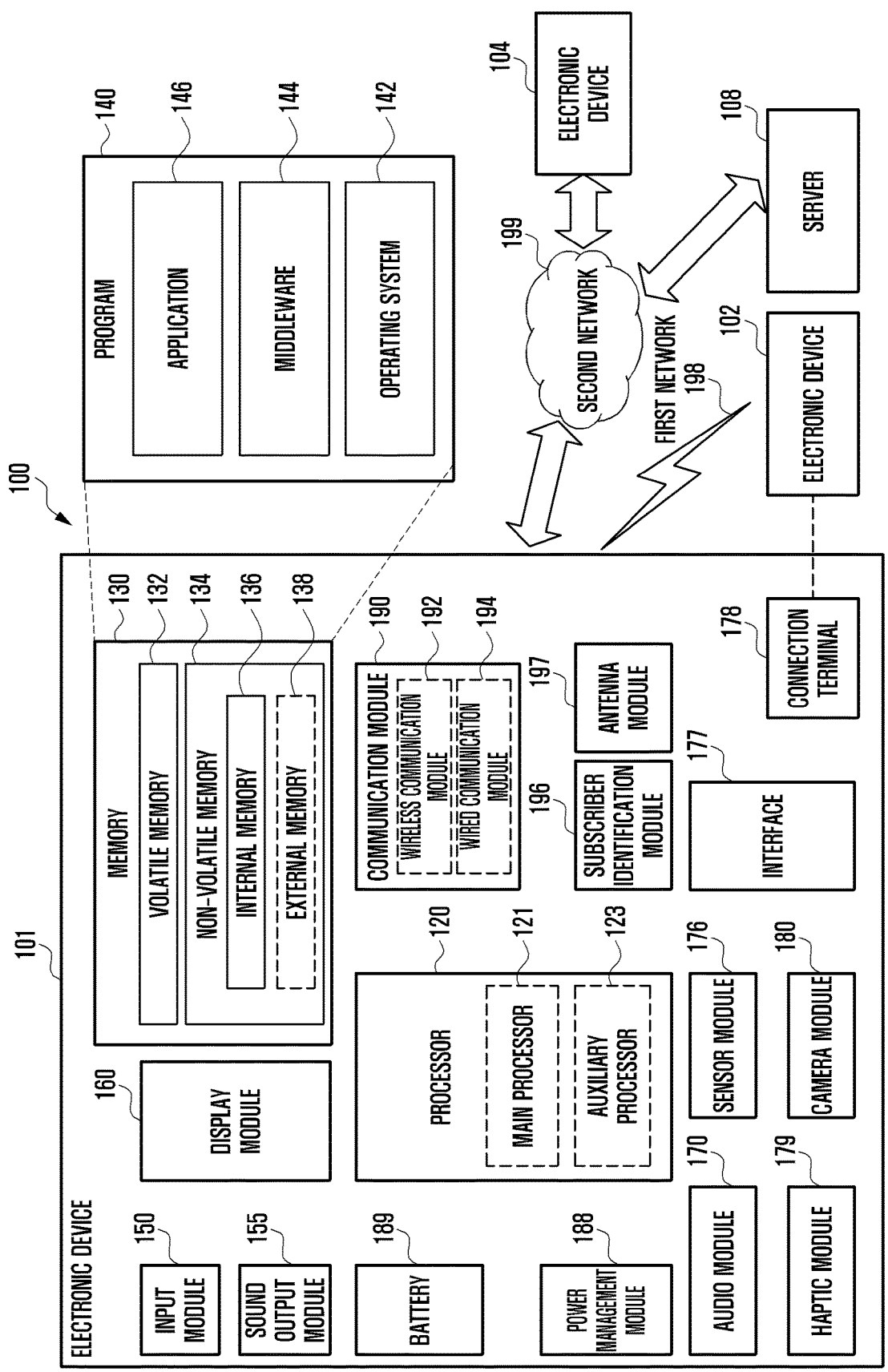
FIG. 1 is a block diagram illustrating an example electronic device in a network environment according to various embodiments.

It should be appreciated that the various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120 memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 1781 may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
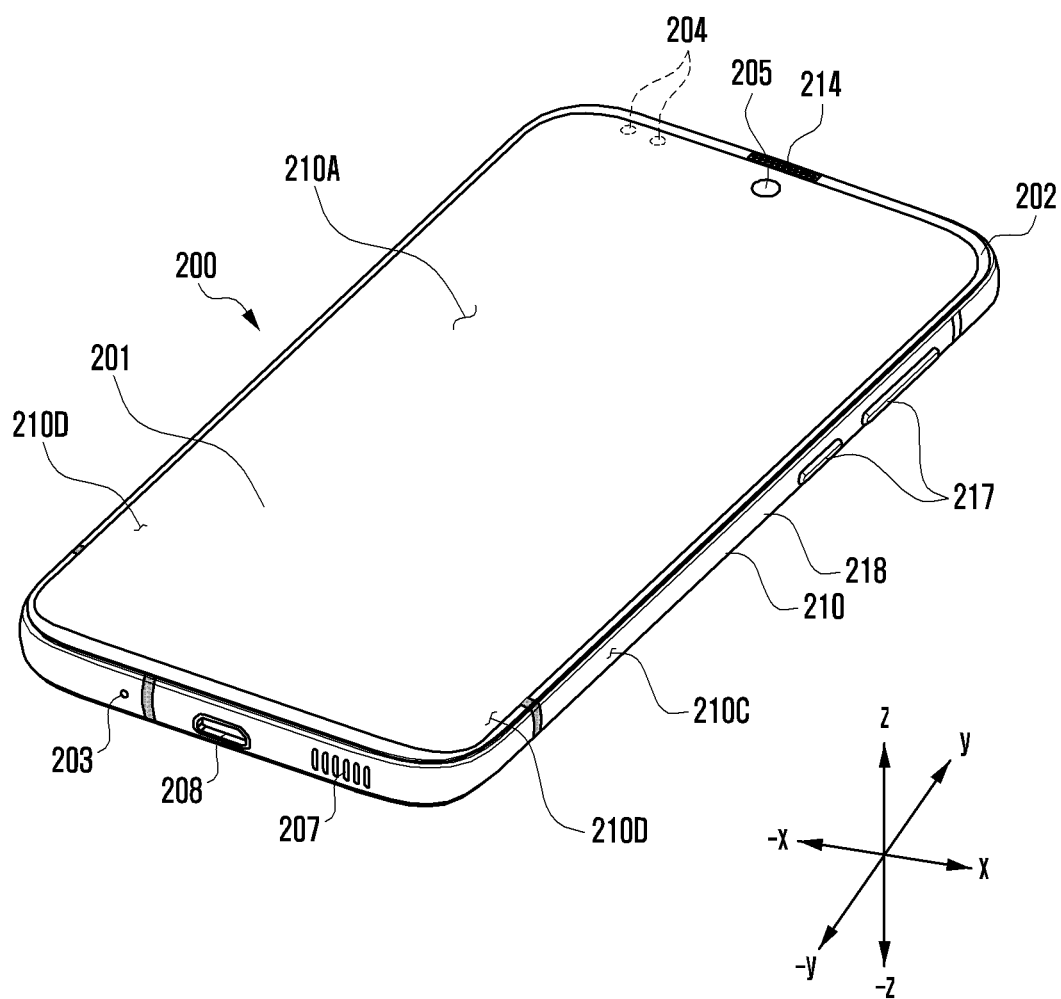
FIG. 2A is a front perspective view illustrating an electronic device according to various embodiments.
Figure 2B:
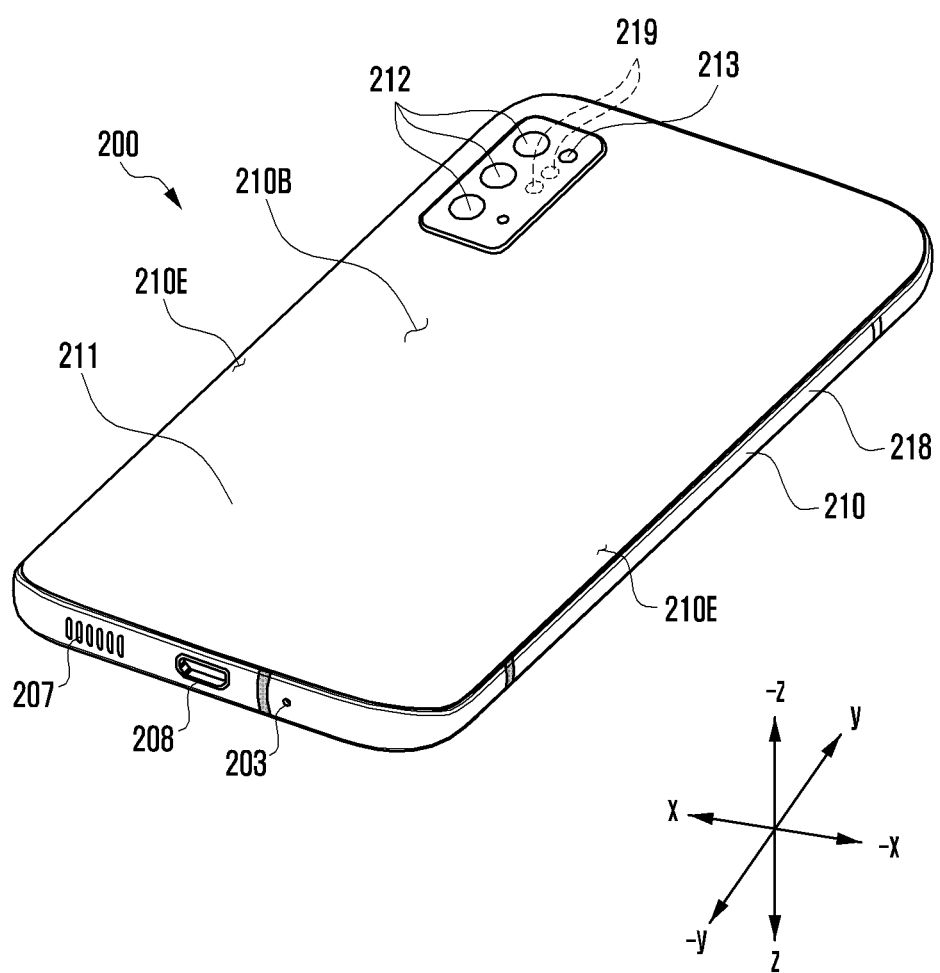
FIG. 2B is a rear perspective view illustrating the electronic device of FIG. 2A according to various embodiments.

FIG. 2A is a front perspective view of an electronic device 200 according to various embodiments. FIG. 2B is a rear perspective view of the electronic device 200 of FIG. 2A according to various embodiments.

The electronic device 200 of FIGS. 2A and 2B may be at least partially similar to the electronic device 101 of FIG. 1 or may include other components of the electronic device.

With reference to FIGS. 2A and 2B, the electronic device 200 according to an embodiment may include a housing 210 including a first surface (or front surface) 210A, a second surface (or rear surface) 210B, and a side surface 210C enclosing a space between the first surface 210A and the second surfaces 210B. In an embodiment (not illustrated), the housing 210 may refer to a structure forming a portion of the first surface 210A, the second surface 210B, and the side surface 210C. According to an embodiment, the first surface 210A may be formed by a front plate 202 (e.g., a polymer plate or a glass plate including various coating layers) having at least a portion substantially transparent. The second surface 210B may be formed by a substantially opaque rear plate 211. The rear plate 211 may be formed by, for example, coated or colored glass, ceramic, polymer, metal (e.g., aluminum, stainless steel (STS), or magnesium), or a combination of at least two of the above materials. The side surface 210C may be coupled to the front plate 202 and the rear plate 211 and be formed by a side bezel structure (or "side member") 218 including a metal and/or a polymer. In various embodiments, the rear plate 211 and the side bezel structure 218 may be integrally formed and include the same material (e.g., a metal material such as aluminum).

In the illustrated embodiment, the front plate 202 may include a first area 210D extended seamlessly by bending from the first surface 210, toward the rear plate at both ends of a long edge of the front plate. In the illustrated embodiment (see FIG. 2B), the rear plate 211 may include a second area 210E extended seamlessly from the second surface 210B toward the front plate at both ends of a long edge. In various embodiments, the front plate 202 or the rear plate 211 may include only one of the first area 210D or the second area 210E. In various embodiments, the front plate 202 does not include the first area and the second area, but may include only a flat plane disposed parallel to the second surface 210B. In the above embodiments, when viewed from the side surface of the electronic device, the side bezel structure 218 may have a first thickness (or width) at the side surface not including the first area 210D or the second area 210E and have a second thickness thinner than the first thickness at a side surface including the first area or the second area.

According to an embodiment, the electronic device 200 may include at least one of a display 201, an input device 203, sound holes 207 and 214, sensor modules 204 and 219, camera modules 212 and 213, a key input device 217, an indicator (not illustrated), or a connector hole 208. In various embodiments, the electronic device 200 may omit at least one (e.g., the key input device 217 or the indicator) of the components or may additionally include other components.

The display 201 may be visible, for example, through a substantial portion of the front plate 202. In various embodiments, at least a portion of the display 201 may be visible through the front plate 202 forming the first area 210D of the first surface 210A and the side surface 210C. The display 201 may be coupled to or disposed adjacent to a touch sensing circuit, a pressure sensor capable of measuring the intensity (pressure) of a touch, and/or a digitizer that detects a magnetic field type stylus pen. In various embodiments, at least a portion of the sensor modules 204 and 219, and/or at least a portion of the key input device 217 may be disposed in the first area 210D and/or the second area 210E.

The input device 203 may include a microphone. In various embodiments, the input device 203 may include a plurality of microphones disposed to detect a direction of a sound. The sound holes 207 and 214 may be connected to a speaker. In various embodiments, the microphone, the speakers, and the connector hole 208 may be disposed in the space of the electronic device 200 and be exposed to an external environment through at least one sound hole 207 and 214 formed in the housing 210. In various embodiments, the sound holes 207 and 214 formed in the housing 210 may be commonly used for a microphone and speakers. In various embodiments, the sound output device may include a speaker (e.g., piezo speaker) that operates while excluding a hole formed in the housing 210.

The sensor modules 204 and 219 may generate electrical signals or data values corresponding to an internal operating state of the electronic device 200 or an external environmental state. The sensor modules 204 and 219 may include, for example, a first sensor module 204 (e.g., proximity sensor) and/or a second sensor module (not illustrated) (e.g., fingerprint sensor) disposed at the first surface 210A of the housing 210, and/or a third sensor module 219 (e.g., HRM sensor) disposed at the second surface 210B of the housing 210. The fingerprint sensor may be disposed at the first surface 210A of the housing 210. The fingerprint sensor (e.g., ultrasonic fingerprint sensor or optical fingerprint sensor) may be disposed under the display 201 of the first surface 210A. The electronic device 200 may further include a sensor module (not illustrated), for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 212 and 213 may include a first camera device (not illustrated) disposed at the first surface 210A of the electronic device 200, and a second camera device 212 disposed at the second surface 210B of the electronic device 200, and/or a flash 213. The camera module 212 may include one or more lenses, an image sensor, and/or an image signal processor. The flash 213 may include, for example, a light emitting diode or a xenon lamp. In various embodiments, two or more lenses (wide-angle and telephoto lenses) and image sensors may be disposed at one surface of the electronic device 200.

The key input device 217 may be disposed at the side surface 210C of the housing 210. In an embodiment, the electronic device 200 may not include some or all of the above-mentioned key input devices 217 and the not included key input device 217 may be implemented into other forms of soft keys or the like on the display 201. In an embodiment, the key input device 217 may be implemented using a pressure sensor included in the display 201.

The indicator may be disposed, for example, at the first surface 210A of the housing 210. The indicator may provide, for example, state information of the electronic device 200 in the form of light. In an embodiment, the light emitting device may provide, for example, a light source interworked with an operation of the camera module 212. The indicator may include, for example, a light emitting diode (LED), an infrared rays (IR) LED, and a xenon lamp.

The connector hole 208 may include a first connector hole 208 capable of receiving a connector (e.g., USB connector or interface connector port module (IF module)) for transmitting and receiving power and/or data to and from an external electronic device and/or a second connector hole (or earphone jack) capable of receiving a connector for transmitting and receiving an audio signal to and from an external electronic device.

Some of the camera modules 212, some of the sensor modules 204 and 219, or indicators may be disposed to be exposed through the display 201. For example, the camera module, the sensor module 204, or the indicator may be disposed to contact an external environment through an opening or a transparent area 205 perforated from an internal space of the electronic device 200 to the front plate 202 of the display 201. According to an embodiment, the camera hole 205 in which the display 201 and the camera module face each other may be formed in a transmission area having a predetermined transmittance as a part of an area displaying contents. According to an embodiment, the transmission area may be formed to have a transmittance in a range of about 5% to about 20%. Such a transmission area may include an area overlapping an effective area (e.g., view angle area) of the camera module through which light for generating an image by an image sensor passes. For example, the transmission area of the display 201 may include an area having a lower pixel density than that of the periphery. For example, the transmission area may replace the opening. For example, the camera module may include a under display camera (UDC). In an embodiment, some sensor modules 204 may be disposed to perform a function thereof without being visually exposed through the front plate 202 in an internal space of the electronic device. For example, in this case, the area of the display 201 facing the sensor module may not need a perforated opening.

Figure 3:
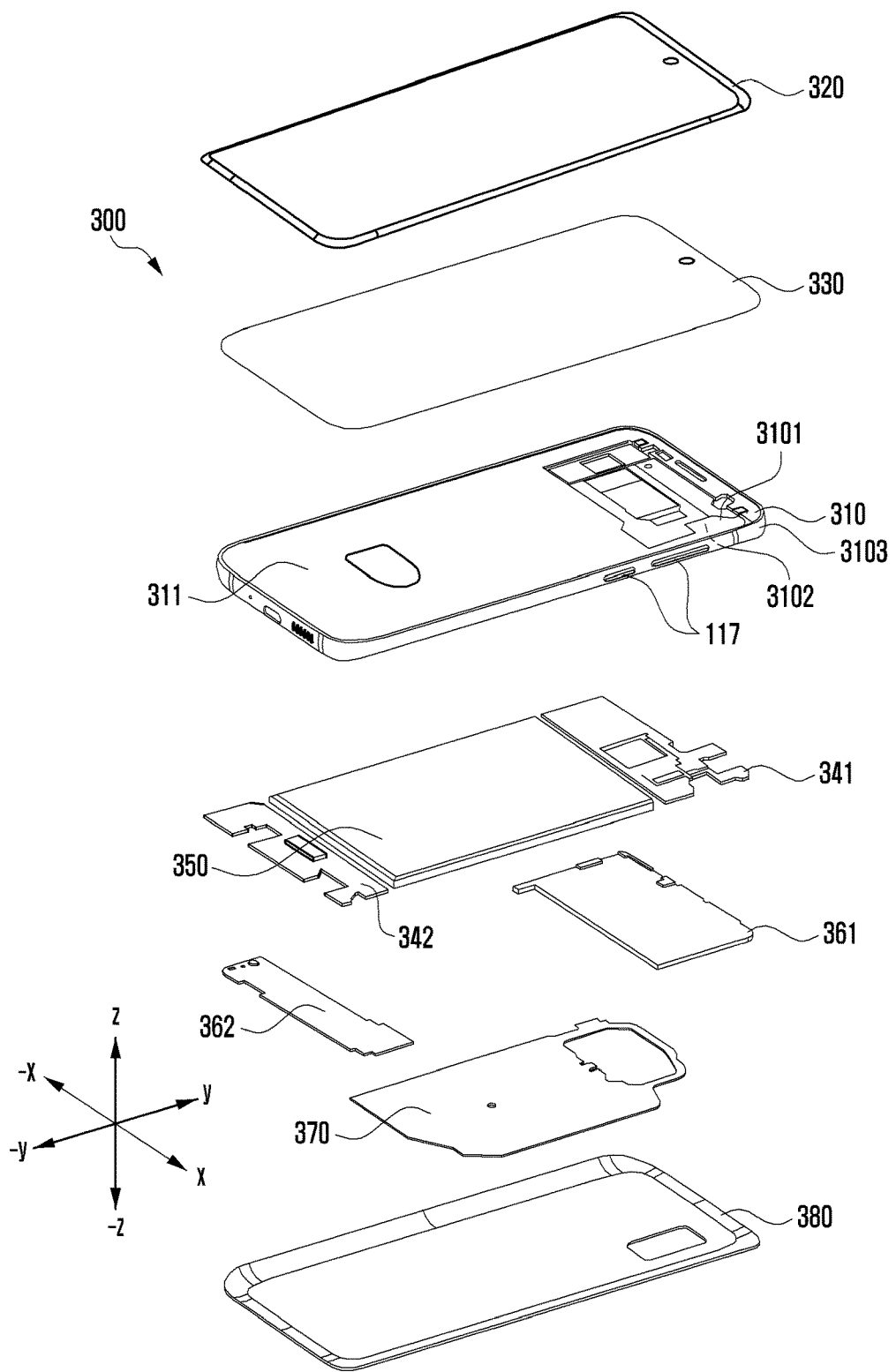
FIG. 3 is an exploded perspective view of the electronic device according to various embodiments.

FIG. 3 is an exploded perspective view illustrating an electronic device according to various embodiments.

An electronic device 300 of FIG. 3 may be at least partially similar to the electronic device 101 of FIG. 1 and/or the electronic device 200 of FIG. 2A or may include other components of the electronic device.

With reference to FIG. 3, the electronic device 300 (e.g., the electronic device 101 of FIG. 1 or the electronic device 200 of FIG. 2) may include a side member 310 (e.g., the side bezel structure 218 of FIG. 2A), a support member 311 (e.g., bracket or support structure), a front cover 320 (e.g., the front plate 202 of FIG. 2A), a display 330 (e.g., the display 201 of FIG. 2A), at least one substrate 341 and 342 (e.g., printed circuit board (PCB), flexible PCB (FPCB), ox rigid-flexible PCB (R-FPCB)), a battery 350, at least one additional support member 361 and 362 (e.g., rear case), an antenna 370, and a rear cover 380 (e.g., the rear plate 211 of FIG. 2). In various embodiments, the electronic device 300 may omit at least one (e.g., the support member 311 or at least one additional support member 361 and 362) of the components or may additionally include other components. At least one of the components of the electronic device 300 may be the same as or similar to at least one of the components of the electronic device 101 of FIG. 1 or the electronic device 200 of FIG. 2A, and a repeated description may be omitted.

According to various embodiments, the side member 310 may include a first surface 3101 facing in a first direction (e.g., z-axis direction), a second surface 3102 facing in a direction opposite to the first surface 3101, and a side surface 3103 enclosing a space (an internal space 4001 of FIG. 4) between the first surface 3101 and the second surface 3102. According to an embodiment, at least a portion of the side surface 3103 may form an external shape of the electronic device. According to an embodiment, the support member 311 may be disposed to extend from the side member 310 toward the internal space (e.g., the internal space 4001 of FIG. 4) of the electronic device 300. In various embodiments, the support member 311 may be disposed separately from the side member 310. According to an embodiment, the side member 310 and/or the support member 311 may be made of, for example, a metal material and/or a non-metal material (e.g., polymer). According to an embodiment, the support member 311 may support at least a portion of the display 330 through the first surface 3101 and be disposed to support at least a portion of the battery 350 and/or at least one substrate 341 and 342 through the second surface 3102. According to an embodiment, the at least one substrate 341 and 342 may include a first substrate 341 (e.g., main substrate) disposed at one side and a second substrate 342 (e.g., sub substrate) disposed at the other side based on the battery 350 in the internal space of the electronic device 300. According to an embodiment, the first substrate 341 and/or the second substrate 342 may include a processor, a memory, and/or an interface. According to an embodiment, the processor may include, for example, one or more of a central processer, an application processor, a graphic processor, an image signal processor, a sensor hub processor, or a communication processor. According to an embodiment, the memory may include, for example, a volatile memory or a non-volatile memory. According to an embodiment, the interface may include, for example, a high definition multimedia interface (HDMI), a universal serial bus (USB) interface, a secure digital (SD) card interface, and/or an audio interface. The interface may, for example, electrically or physically connect the electronic device 300 to an external electronic device, and include a USB connector, an SD card/multimedia connect (MMC) connector, or an audio connector. According to an embodiment, the battery 350 is a device for supplying power to at least one component of the electronic device 300 and may include, for example, a non-rechargeable primary cell, a rechargeable secondary cell, or a fuel cell. At least a portion of the battery 350 may be disposed on a substantially same plane as, for example, at least one of the substrates 341 and 342. According to an embodiment, the battery 350 may be disposed in a way that it is embedded in the electronic device 300. In various embodiments, the battery 350 may be detachably disposed from the electronic device 300.

According to various embodiments, the antenna 370 may be disposed between the rear cover 380 and the battery 350. According to an embodiment, the antenna 370 may include, for example, a near field communication (NFC) antenna, a wireless charging antenna, and/or a magnetic secure transmission (MST) antenna. The antenna 370 may, for example, perform short range communication with an external device or wirelessly transmit and receive power required for charging. In various embodiments, the antenna may be formed by some or a combination of the side member 310 and/or the support member 311. In various embodiments, the electronic device 300 may further include a digitizer for detecting an external electronic pen.

Figure 4:
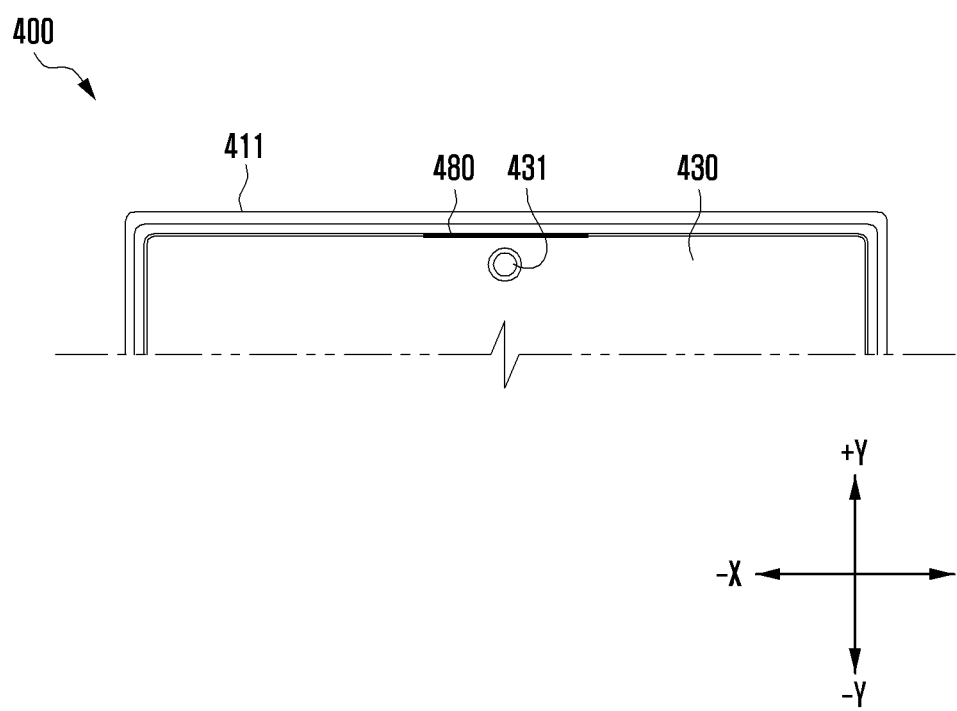
FIG. 4 is a diagram illustrating a part of an electronic device according to various embodiments.
Figure 5A:
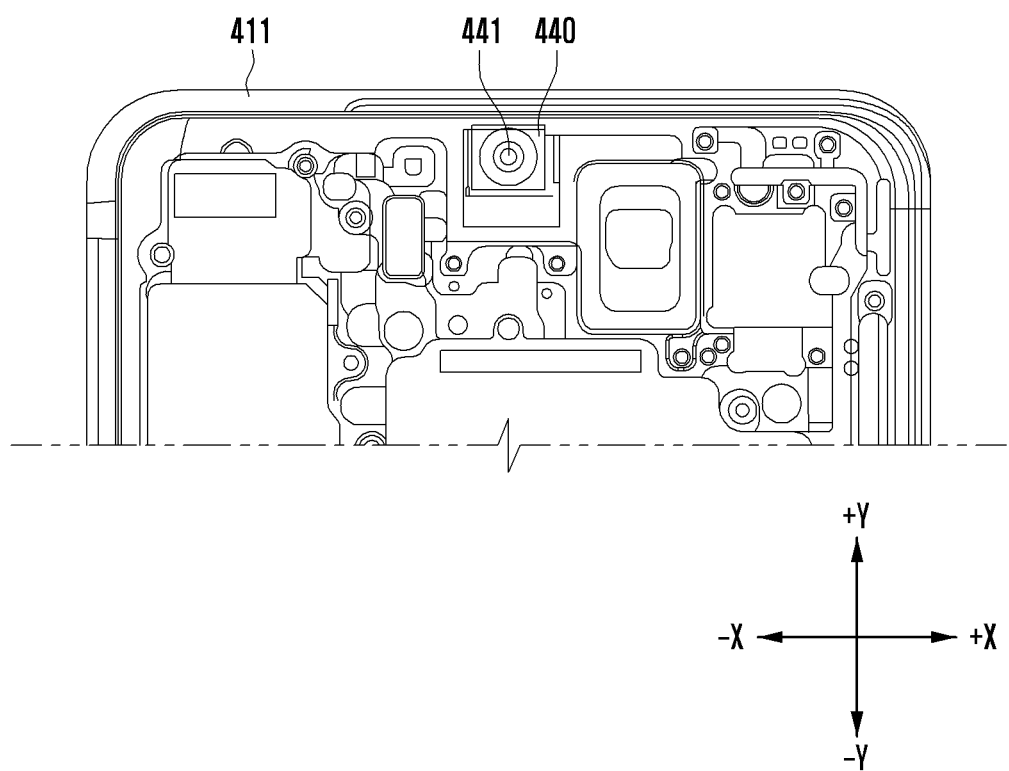
FIG. 5A is a diagram illustrating a housing of an electronic device viewed from the front of the electronic device according to various embodiments.
Figure 5B:
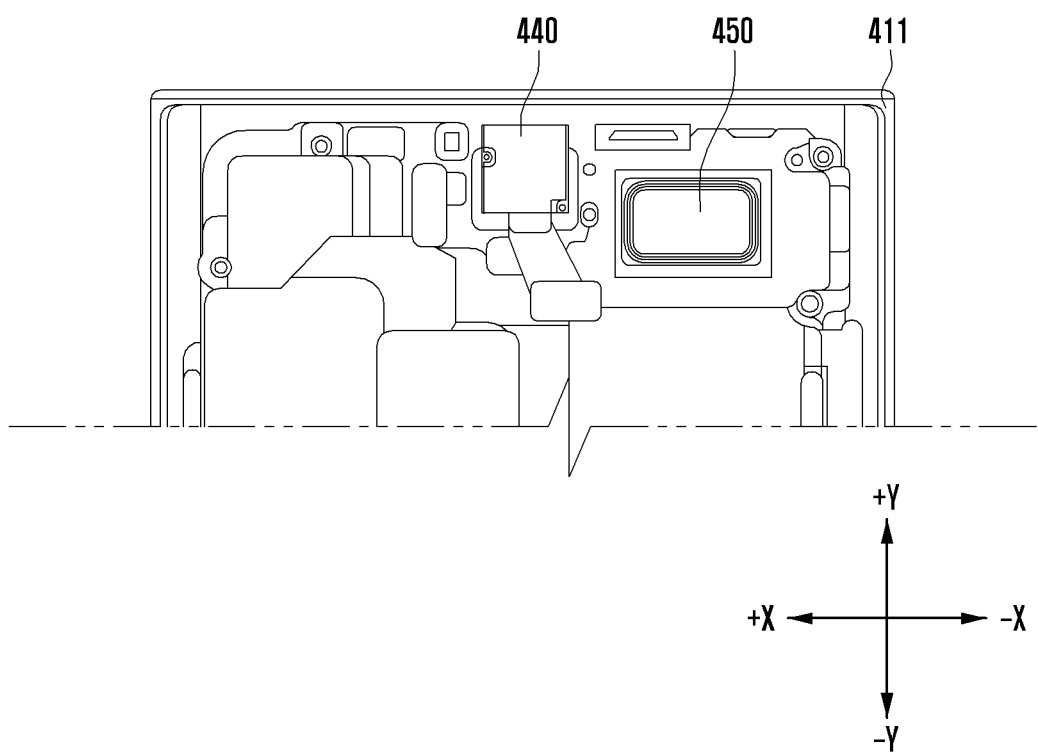
FIG. 5B is a diagram illustrating a housing of an electronic device viewed from the rear of the electronic device according to various embodiments.

FIG. 4 is a diagram illustrating a part of an electronic device according to various embodiments. FIG. 5A is a diagram illustrating a housing of an electronic device viewed from the front of the electronic device according to various embodiments. FIG. 5B is a diagram illustrating a housing of an electronic device viewed from the rear of the electronic device according to various embodiments.

An electronic device 400 according to various embodiments may be an example of the electronic device 101 of FIG. 1, the electronic device 200 of FIGS. 2A and 2B, and/or the electronic device 300 of FIG. 3. Accordingly, the electronic device 400 described below may include at least one of the components of the electronic devices described with reference to FIGS. 1, 2A, 2B, and 3.

Figure 8A:
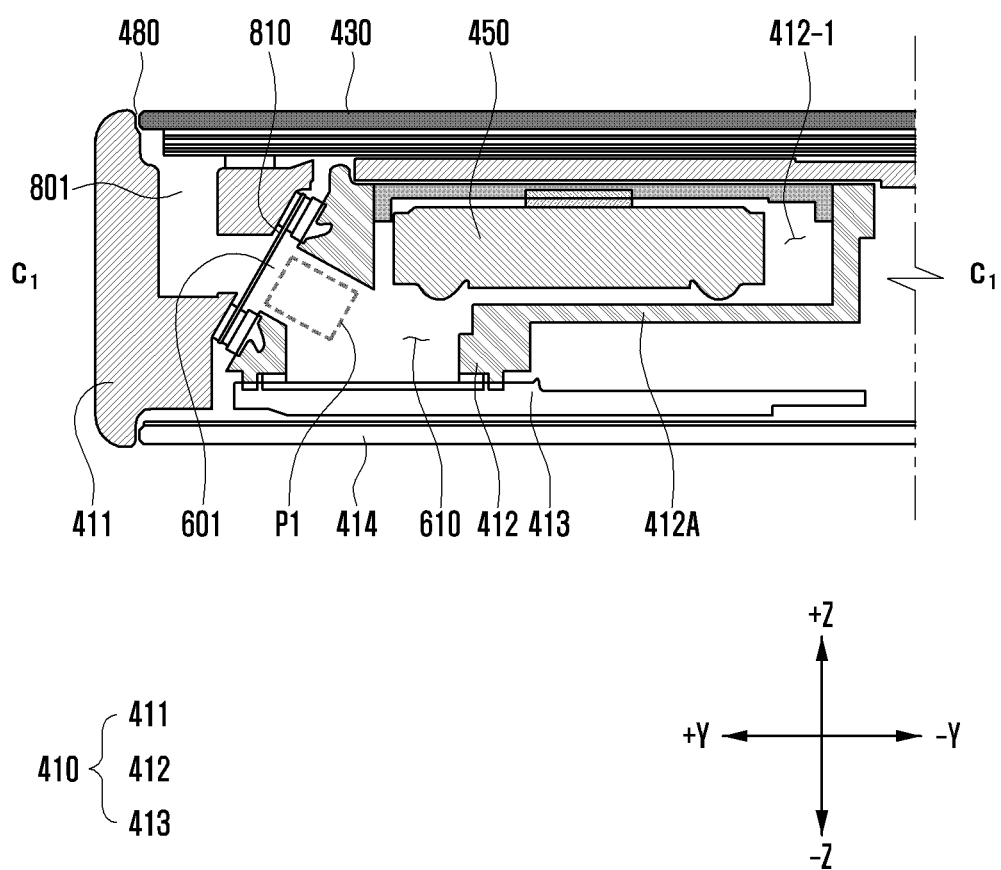
FIG. 8A is a cross-sectional view illustrating an electronic device taken along line C1-C1 of FIG. 7 according to various embodiments.

In an embodiment, the electronic device 400 may include a housing assembly (e.g., a housing assembly 410 of FIG. 8A) for supporting various device objects and electrical objects of the same and having at least a portion of an external shape (e.g., the side bezel structure 218 of FIG. A) of the same. The electrical objects may be understood as a generic term for a component for transmitting or receiving an electric signal. The housing assembly may be configured as a single component or may be configured in a manner in which a plurality of components are coupled. For example, as illustrated in FIG. 8A, the housing assembly may include a housing 411 (e.g., the housing 210 of FIG. 2A), a first support (e.g., a first support 412 of FIG. 8A), and a second support (e.g., a second support 413 of FIG. 8A).

In an embodiment, the housing assembly may be made of various materials. When the housing 411 assembly may include a plurality of components (e.g., the housing 411, the first support 412, and the second support 413), each component may be made of the same material or different materials. The housing assembly may be made of various materials such as a synthetic resin material, a metal material, and a composite material.

In an embodiment, at least a portion of the housing 411 may provide an external shape of the electronic device 400. The housing 411 may include a portion supporting a display module 430 of the electronic device 400.

In an embodiment, a camera module 440 may be disposed so that a lens unit 441 of the camera module 440 (e.g., the camera module 180 of FIG. 1) is aligned with the center of a width direction an X-axis direction of FIG. 5A) of the housing 411. With reference to FIG. 4, the display module 430 may include a camera hole 431 facing the lens unit 441 of the camera module 440. The camera hole 431 may be a portion in which external light passes through the camera module 440 to be incident on the lens unit 441 of the camera module 440. At least a portion of the portion corresponding to the camera hole 431 may be transparent.

With reference to FIG. 5B, in various embodiments, a speaker module 450 (e.g., the sound output module 155 of FIG. 1) of the electronic device 400 may be disposed in a first direction (e.g., an −X axis direction of FIG. 5B) with respect to the camera module 440. When the lens unit 441 of the camera module 440 is disposed to be aligned with the center of the housing 411 in the width direction, the speaker module 450 may be disposed eccentrically with respect to the center of the housing 411 in the width direction.

With reference to FIG. 4, the electronic device 400 may include a sound hole 480 (e.g., the sound holes 214 and 207 of FIG. 2A) for connecting the outside thereof and an internal space thereof. The sound hole 480 may include, for example, a slit-shaped groove interposed between the housing 411 and the display module 430. The slit-shaped sound hole 480 may be formed to extend in a predetermined direction (e.g., the X-axis direction of FIG. 4). The sound hole 480 may be positioned so that the center of a longitudinal direction (e.g., the X-axis direction of FIG. 4) is aligned with the camera hole 431. In other words, the sound hole 480 may be formed symmetrically with respect to the camera hole 431. Because the camera hole 431 may be aligned with the center of the housing 411, the sound hole 480 aligned with the camera hole 431 may be formed to be aligned with the center of the housing 411. In various embodiments, at least a portion of the housing 411 and the display module 430 may be formed concavely to form the slit-shaped sound hole 480. In some cases, the slit-shaped sound hole 480 may be provided by a step formed between the housing 411 and the display module 430. A foreign material preventing/reducing member including a mesh may be disposed in the sound hole 480 so as to prevent/reduce a foreign material from being introduced through the sound hole 480. The foreign material preventing/reducing member may be disposed at the entrance of the sound hole 480 or inside the sound hole 480. Although the sound hole 480 has been described with reference to FIG. 4, the sound hole 480 may include a plurality of openings formed at the side surface of the housing 411 (e.g., the sound hole 207 of FIG. 2A).

Figure 6:
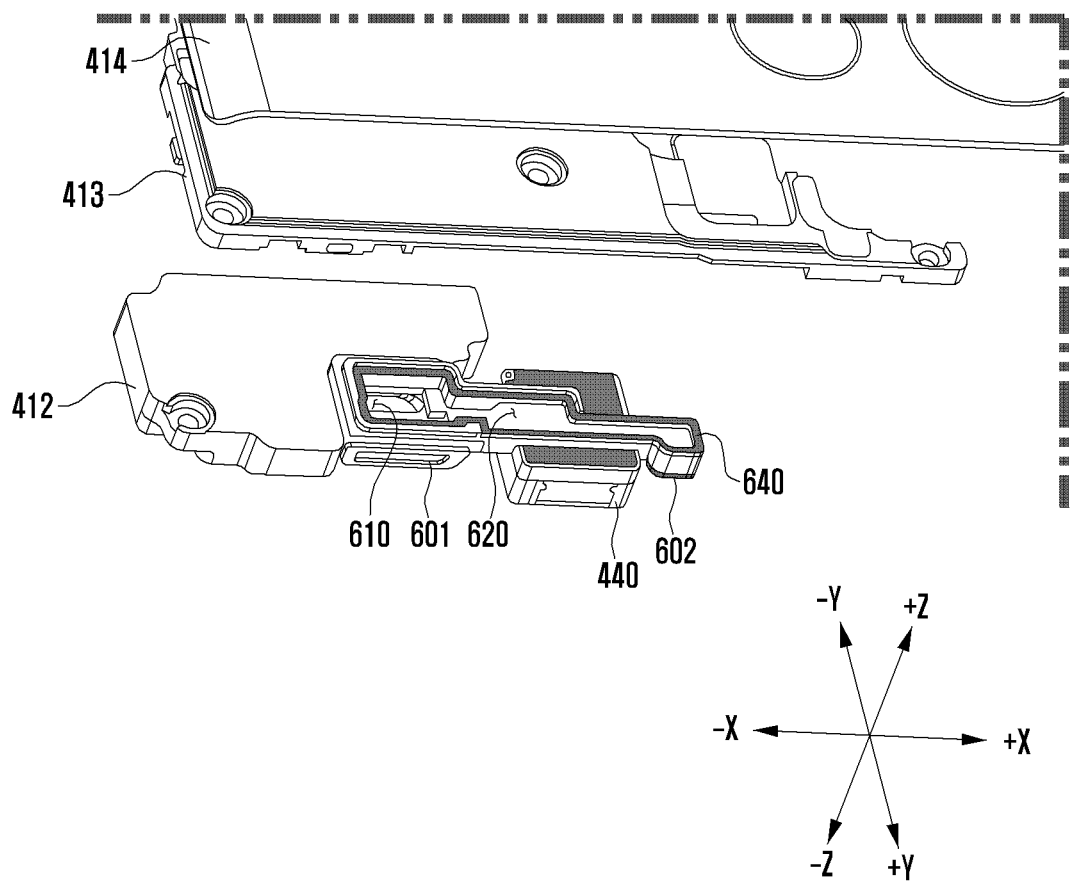
FIG. 6 is an exploded perspective view illustrating a portion of an electronic device according to various embodiments.
Figure 7:
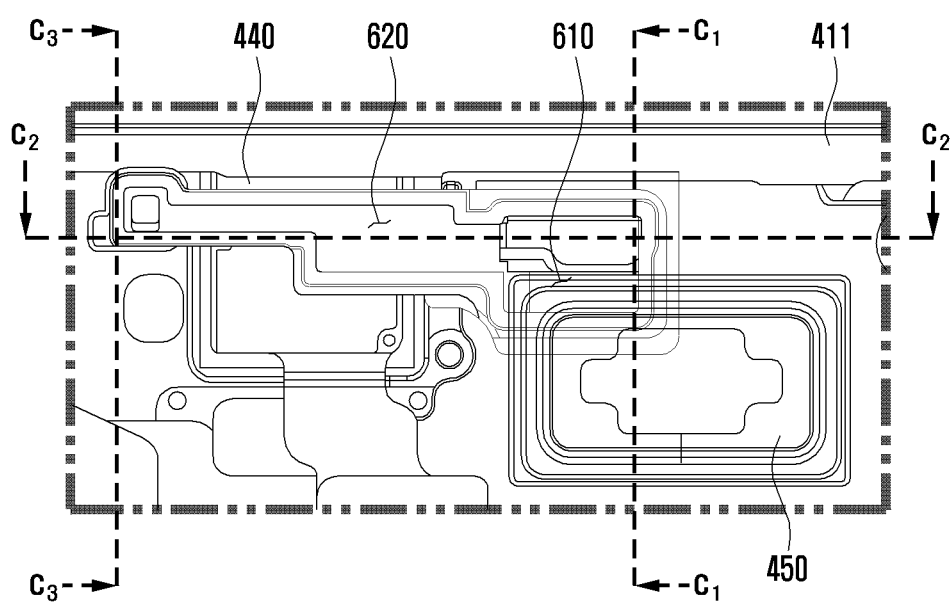
FIG. 7 is a diagram illustrating a sound channel of an electronic device viewed from one direction according to various embodiments.
Figure 7:
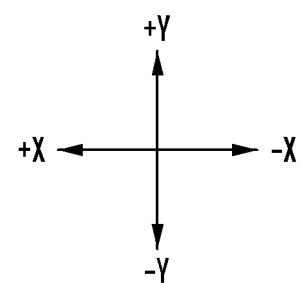
Figure 8B:
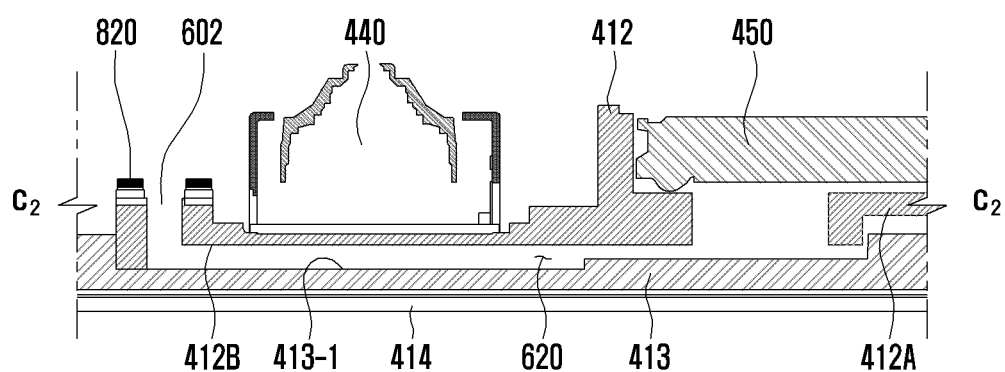
FIG. 8B is a cross-sectional view illustrating an electronic device taken along line C2-C2 of FIG. 7 according to various embodiments.
Figure 8B:
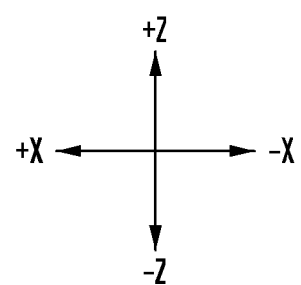
Figure 8C:
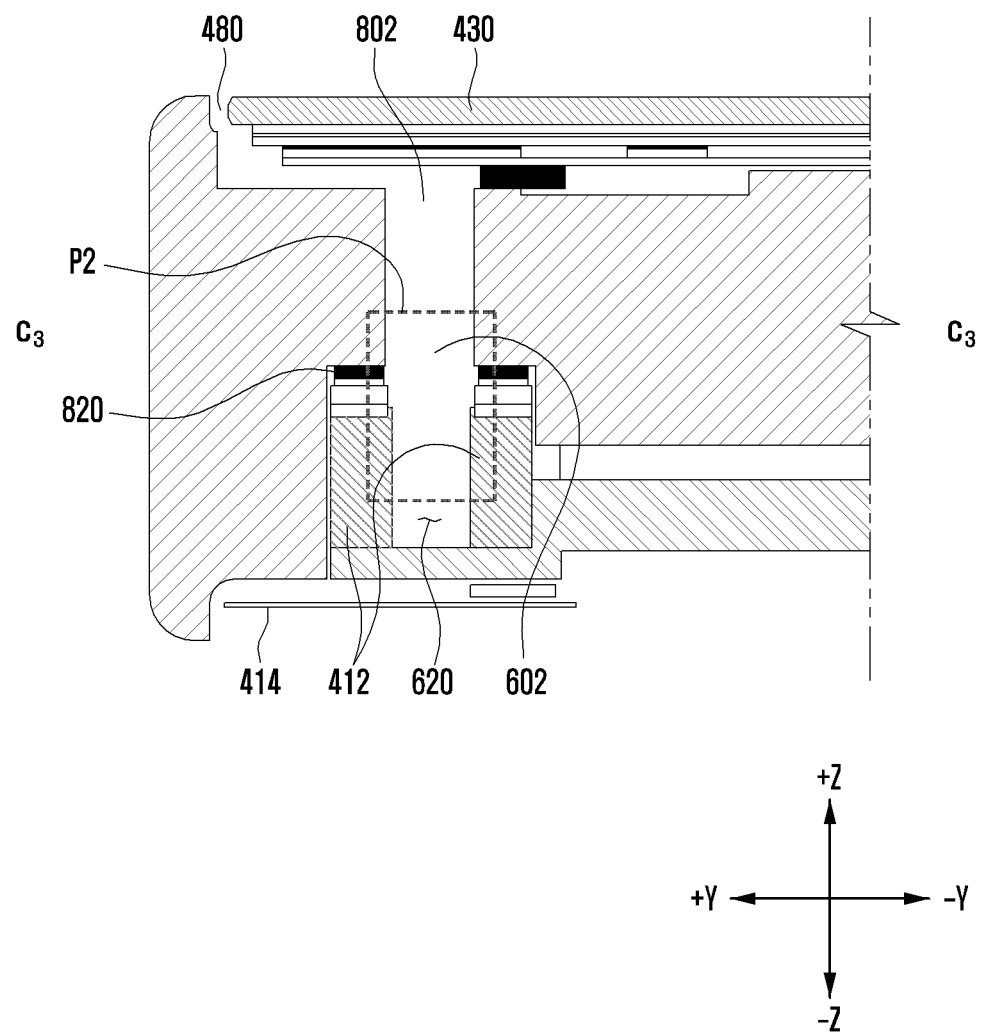
FIG. 8C is a cross-sectional view illustrating an electronic device taken along line C3-C3 of FIG. 7 according to various embodiments.

FIG. 6 is an exploded perspective view illustrating a portion of an electronic device according to various embodiments. FIG. 7 is a diagram illustrating a sound channel of an electronic device viewed from one direction according to various embodiments. FIG. 8A is a cross-sectional view illustrating an electronic device taken along line C1-C1 of FIG. 7 according to various embodiments. FIG. 8B is a cross-sectional view illustrating an electronic device taken along line C2-C2 of FIG. 7 according to various embodiments. FIG. 8C is a cross-sectional view illustrating an electronic device taken along line C3-C3 of FIG. 7 according to various embodiments.

With reference to FIGS. 6 and 8A, a first support 412 and a second support 413 may be disposed inside the housing 411 to support various device objects or electrical objects of the electronic device 400. An internal space of the electronic device 400 may be partitioned by the housing 411, the first support 412, and the second support 413 to determine the layout of the device objects and electrical objects disposed in the electronic device 400. The first support 412 and the second support 413 may be integrally formed. In various embodiments, at least one of the housing 411, the first support 412, and the second support 413 may be integrally formed.

In an embodiment, the first support 412 may be disposed inside the housing 411. With reference to FIG. 8B, the first support 412 may include a speaker support 412A for supporting the speaker module 450 and a camera support 412B for supporting the camera module 440. At least a portion of the speaker support 412A may be formed to correspond to an external shape of the speaker module 450. With reference to FIG. 8A, the speaker support 412A may include a space 412-1 formed to receive the speaker module 450. At least a portion of the camera support 412B may be formed to correspond to the external shape of the camera module 440. In various embodiments, the camera support 412B may support a camera substrate (e.g., PCB) electrically connected to the camera module 440. The speaker support 412A and the camera support 412B may be integrally formed. In various embodiments, the speaker support 412A and the camera support 412B may be formed as separate device objects.

In an embodiment, the speaker module 450 may be disposed in a first direction (e.g., −X axis direction of FIG. 7) with respect to the camera module 440. With reference to FIG. 8B, the speaker support 412A for supporting the speaker module 450 may be disposed in a first direction with respect to the camera support 412B for supporting the camera module 440.

In an embodiment, the second support 413 may be disposed inside the housing 411. The second support 413 may be disposed in a third direction (e.g., −Z axis direction of FIG. 8B)) perpendicular to the first direction with respect to the first support 412. At least a portion of the second support 413 may be coupled to the first support 412. With reference to FIGS. 6 and 8A, a cover member 414 of the electronic device 400 may be disposed in a third direction with respect to the second support 413. The first support 412 and the second support 413 may be made of the same material or different materials.

According to various embodiments, a sound emitted from the speaker module 450 may be emitted to the outside of the electronic device 400 through a channel formed or provided in the housing assembly 410. A "channel" may refer, for example, to a passage that guides transmission of a sound (sound wave). For example, the channel may refer, for example, to a physical space. The channel may include a space filled with a medium (e.g., air) capable of transmitting sound waves. Hereinafter, transmission of sound through a channel may refer, for example, to transmission of a sound through a specific space.

The speaker module 450 of the electronic device 400 according to various embodiments may be disposed eccentrically with respect to the center of the housing 411 (or the first direction with respect to the camera module 440). In an embodiment, the sound hole 480 for connecting the outside of the electronic device 400 and the internal space of the electronic device 400 may be positioned in alignment with the center of the housing 411. For example, in the case of the sound hole 480 (e.g., the slit-shaped sound hole 480) extended in a predetermined (e.g., specified) direction, a portion of the sound hole 480 may be adjacent to the speaker module 450, and other portions of the sound hole 480 may be relatively spaced apart from the speaker module 450. When the slit-shaped sound hole 480 is formed to be aligned with the center of the housing 411, a distance between the speaker module 450 and the sound hole 480 may be different in each part of the sound hole 480. In such a structure, in the case of providing a sound channel simply connecting the speaker module 450 and the sound hole 480, an unbalanced output problem may occur in which an output sound may be large in a portion of the sound hole 480 relatively adjacent to the speaker module 450 and in which an output sound may be relatively small in a portion of the sound hole 480 relatively far from the speaker module 450. Various embodiments may include a sound channel (e.g., a first sound channel 610 of FIG. 7) connected to a portion of the sound hole 480 adjacent to the speaker module 450 and a sound channel (e.g., a second sound channel 620 of FIG. 7) connected to a portion of the sound hole 480 relatively far from the speaker module 450 to reduce a deviation of the sound output through the sound hole 480.

The first sound channel 610 will be described. With reference to FIGS. 6 and 7, the first sound channel 610 may be a sound channel connecting the speaker module 450 and a first sound outlet 601 positioned in the first direction with respect to the camera module 440. The first sound channel 610 may include a space formed by the first support 412 and the second support 413. In various embodiments, the first sound channel 610 may be formed by the first support 412 and a member coupled to the first support 412. With reference to FIG. 8A, the first sound outlet 601 connected to the first sound channel 610 may be connected to the sound hole 480 through a first connection part 801 formed in the housing 411. A sound output from the speaker module 450 may be output to the outside of the electronic device 400 via the first sound channel 610—the first sound outlet 601—the first connection part 801—and the sound hole 480.

According to various embodiments, the first sound channel 610 or the sound passage connected to the first sound channel 610 may include a passage P1 extended obliquely with respect to a third direction perpendicular to the first direction and the second direction. Further, the sound passage connected to the first sound channel 610 or the second sound channel 620 may be formed to be extended in various directions.

In an embodiment, the electronic device 400 may include a first sealing member 810. The first sealing member 810 may be disposed on the first sound channel 610 or a sound passage connected to the first sound channel 610 so as to prevent/reduce a foreign material outside the electronic device 400 from being introduced into the electronic device 400 through the first sound channel 610. For example, as illustrated in FIG. 8A, the first sealing member 810 may be disposed between the first connection part 801 and the first sound outlet 601. The first sealing member 810 may include an adhesive member to be fixed to another device object, and include a mesh structure capable of transmitting sound but blocking foreign materials.

Hereinafter, the second sound channel 620 will be described. With reference to FIGS. 6 and 7, the second sound channel 620 may be a sound channel connecting the speaker module 450 and a second sound outlet 602 positioned in a second direction opposite to the first direction with respect to the camera module 440. As illustrated in FIGS. 6 and 7, the second sound channel 620 may be formed in a shape that passes through the camera module 440 from the speaker module 450 disposed in the first direction with respect to the camera module 440 and extended to the second sound outlet 602 positioned in the second direction of the camera module 440. In an embodiment, the second sound channel 620 may include a space provided between the first support 412 and the second support 413. With reference to FIG. 6, an airtight member 640 for sealing between the first support 412 and the second support 413 may be disposed between the first support 412 and the second support 413.

With reference to FIG. 8B, the second sound channel 620 may pass through a portion adjacent to the camera module 440. The second sound channel 620 may include a space provided between the second support 413 and the camera support 412B for supporting the camera module 440. The second sound channel 620 may include a groove concavely formed in at least one of the first support 412 or the second support 413. A volume of the second sound channel 620 may be secured by the groove formed concavely in at least one of the first support 412 or the second support 413. For example, as illustrated in FIG. 8B, the second sound channel 620 may include a portion in which a groove 413-1 is concavely formed in the second support 413. With reference to FIG. 8B, the speaker module 450 disposed in the first direction with respect to the camera module 440 and the second sound outlet 602 disposed in the second direction with respect to the camera module 440 may be connected by the second sound channel 620.

With reference to FIG. 8C, the second sound outlet 602 connected to the second sound channel 620 may be connected to the sound hole 480 by a second connection part 802 formed in the housing 411. A sound output from the speaker module 450 may be output to the outside of the electronic device 400 via the second sound channel 620—the second sound outlet 602—the second connection part 802—the sound hole 480.

According to various embodiments, the second sound channel 620 or the sound passage connected to the second sound channel 620 may include a passage P2 extended in parallel with respect to a third direction perpendicular to the first direction and the second direction. Further, the second sound channel 620 or the sound passage connected to the second sound channel 620 may be formed to be extended in various directions.

In an embodiment, the electronic device 400 may include a second sealing member 820. The second sealing member 820 may be disposed on a sound passage connected to the second sound channel 620 or the second sound channel 620 so as to prevent/reduce foreign materials from the outside of the electronic device 400 from being introduced into the electronic device 400 through the second sound channel 620. For example, as illustrated in FIG. 8C, the second sealing member 820 may be disposed between the second connection part 802 and the second sound outlet 602. The second sealing member 820 may include an adhesive member so as to be fixed to another device object, and include a mesh structure capable of transmitting a sound but blocking foreign materials.

In the electronic device 400 according to various embodiments\, a sound output from the speaker module 450 may be transmitted to the sound hole 480 through the first sound channel 610 and the second sound channel 620 and be emitted to the outside through the sound hole 480. As described above, the first sound channel 610 may be a sound channel connected to the first sound outlet 601 disposed in the first direction with respect to the camera module 440, and the second sound channel 620 may be a sound channel connected to the second sound outlet 602 disposed in a second direction with respect to the camera module 440. The first sound outlet 601 positioned in the first direction with respect to the camera module 440 may be positioned in a portion adjacent to the speaker module 450 disposed in the first direction with respect to the camera module 440, and the second sound outlet 602 positioned in the second direction with respect to the camera module 440 may be positioned at a portion relatively far from the speaker module 450. Both the first sound outlet 601 and the second sound outlet 602 may be connected to the sound hole 480. The sound output from the speaker module 450 through the first sound channel 610 and the second sound channel 620 may be transferred to the first sound outlet 601 and the second sound outlet 602, respectively. The first sound outlet 601 may be positioned in a portion of the sound hole 480 adjacent to the speaker module 450, and the second sound outlet 602 may be positioned in a portion of the sound hole 480 relatively far from the speaker module 450. By separately providing the second sound channel 620 for transmitting the sound of the speaker module 450 to the second sound outlet 602 connected to the sound hole 480 relatively far from the speaker module 450, a sound output imbalance problem according to a relative distance between the speaker module 450 and the sound hole 480 may be reduced.

Figure 9:
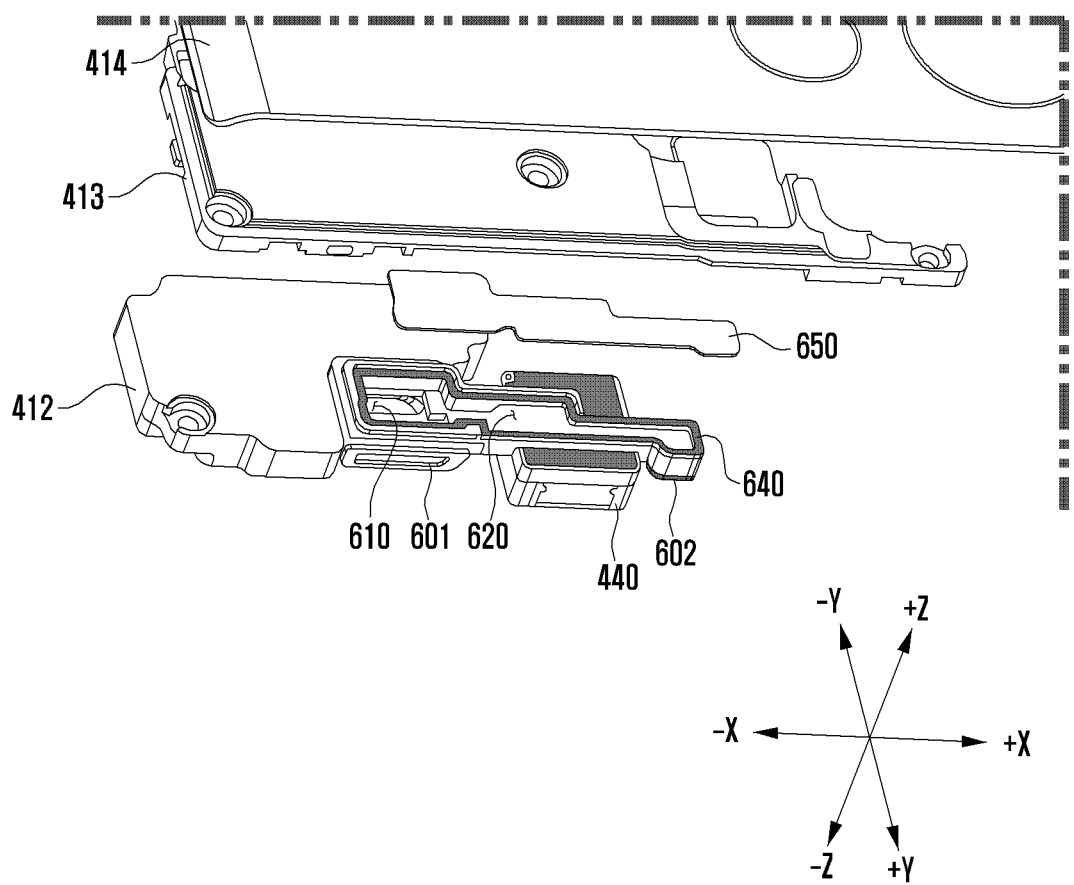
FIG. 9 is an exploded perspective view illustrating a portion of an electronic device according to various embodiments.
Figure 10:
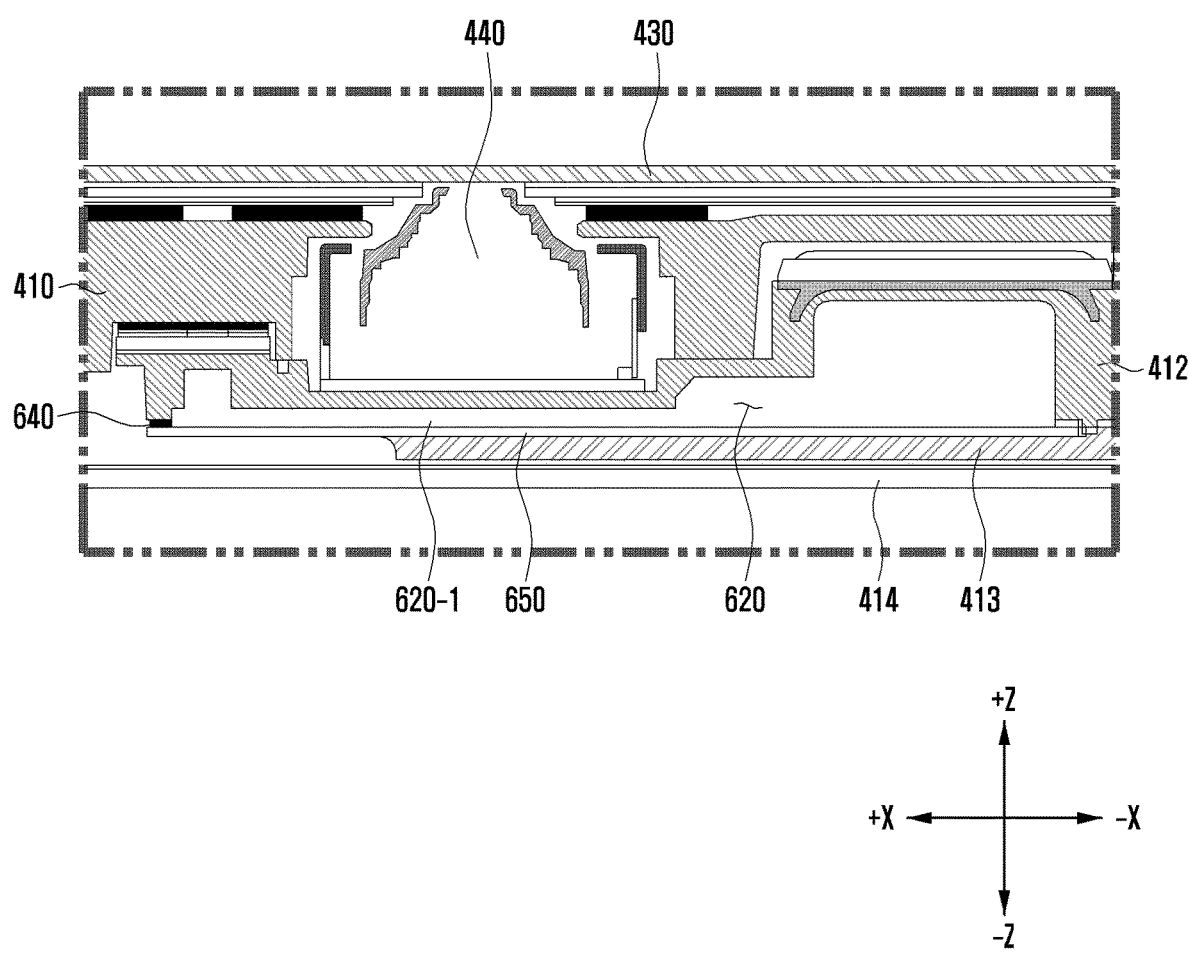
FIG. 10 is a cross-sectional view illustrating a portion of a second sound channel included in the electronic device illustrated in FIG. 9 according to various embodiments.

FIG. 9 is an exploded perspective view illustrating a portion of an electronic device according to various embodiments. FIG. 10 is a cross-sectional view illustrating a portion of a second sound channel included in the electronic device illustrated in FIG. 9 according to various embodiments.

In the following description, the same reference numerals are used for the same components as or similar components to the components described in the previous description, and a detailed description thereof will be omitted.

With reference to FIGS. 9 and 10, a second sound channel 620 may be formed by a cover bracket 650 for closing an opening 620-1 formed in the first support 412 and the first support 412. The cover bracket 650 may comprise, for example, a metal material. The airtight member 640 for coupling the cover bracket 650 to the first support 412 and sealing between the cover bracket 650 and the first support 412 may be disposed between the cover bracket 650 and the first support 412.

In various embodiments, because the cover bracket 650 may be made of a metal material, it may be easy to produce the cover bracket 650 in a thin thickness. When the second sound channel 620 is formed by closing the opening 620-1 of the first support 412 through the cover bracket 650, the thickness of the cover bracket 650 may be produced thin; thus, an entire thickness of the electronic device 400 can be reduced.

Figure 11A:
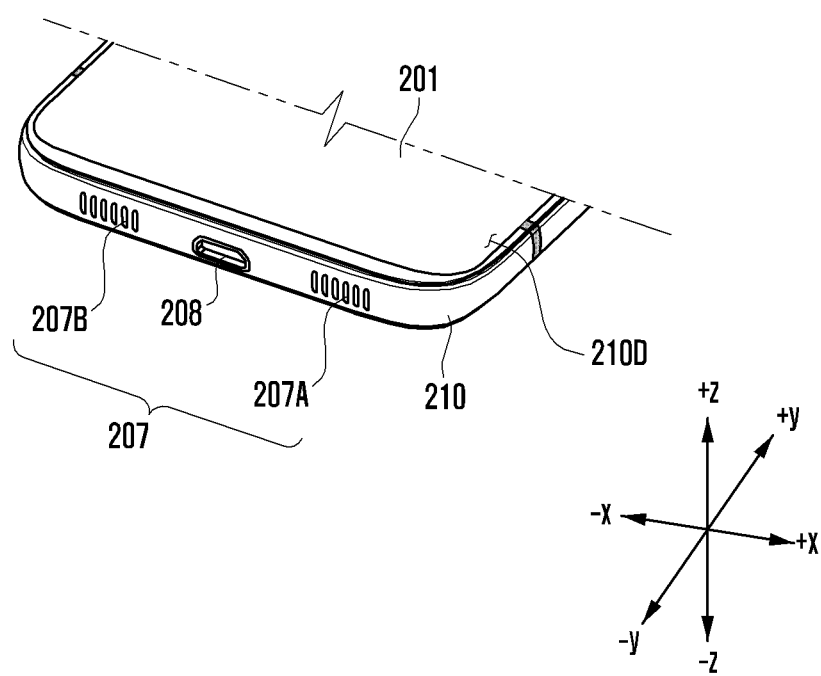
FIG. 11A is a perspective view illustrating a portion of an electronic device according to various embodiments.
Figure 11B:
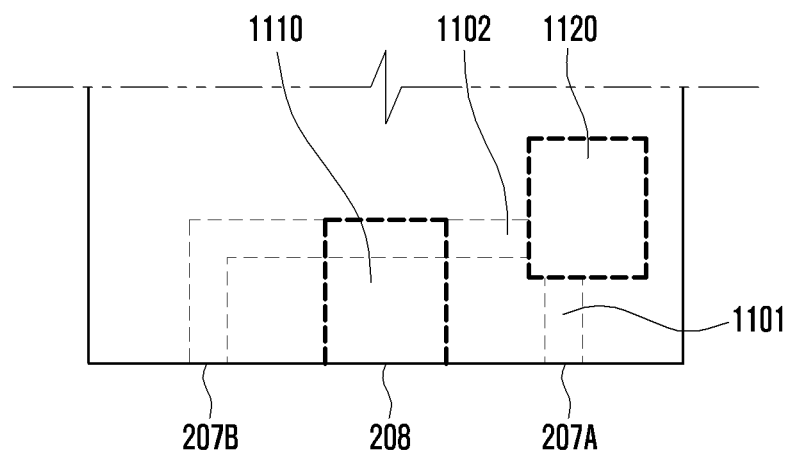
FIG. 11B is a diagram illustrating a sound channel of an electronic device according to various embodiments.
Figure 11B:
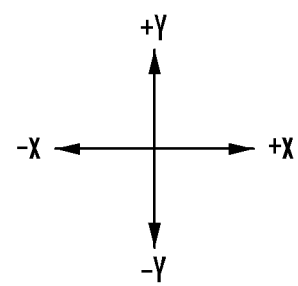

FIG. 11A is a perspective view illustrating a portion of an electronic device according to various embodiments. FIG. 11B is a diagram illustrating a sound channel of an electronic device according to various embodiments.

Hereinafter, a sound channel structure according to the relative positional relationship between an interface 1110 (e.g., the interface 177 of FIG. 1) and a speaker module 1120 of the electronic device will be described.

In an embodiment, the interface 1110 may refer, for example, to a component for connecting the electronic device and an external electronic device. The interface 1110 may include, for example, a universal serial bus (USB). The interface 1110 may support a USB C-type connection. The connector hole 208 (e.g., the connection terminal 178 of FIG. 1, the connector hole 208 of FIG. 2A) formed in the housing 210 of the electronic device may be a portion for receiving a connector (e.g., USB connector). The connector may be electrically connected to the interface 1110. The connector hole 208 may be formed in the housing 210 at a position aligned with the center of the housing 210 in a width direction (e.g., the X-axis direction of FIG. 11A).

In an embodiment, the sound hole 207 may be formed in the housing 210 at a symmetrical position with respect to the interface 1110. For example, as illustrated in FIG. 11A, the sound hole 207 may include a first sound hole 207A formed in the housing 210 in a first direction (e.g., +X axis direction of FIG. 11A) with respect to the connector hole 208 and a second sound hole 207B formed in the housing 210 in a second direction (e.g., −X axis direction of FIG. 11A) opposite to the first direction with respect to the connector hole 208. A distance between the first sound hole 207A and the connector hole 208 may be the same as or similar to a distance between the second sound hole 207B and the connector hole. Further, the sound hole (e.g., +X axis direction of FIG. 11A) may include a slit-shaped hole the sound hole 480 of FIG. 4) provided between the display module 201 and the housing 210, as described above with reference to FIG. 4.

With reference to FIG. 11B, the speaker module 1120 may be disposed in a first direction with respect to the interface 1110. A sound output from the speaker module 1120 may be transferred to the sound hole 207 through a first sound channel 1101 and a second sound channel 1102. The first sound channel 1101 may connect the first sound hole 207A and the speaker module 1120. The second sound channel 1102 may connect the second sound hole 207B and the speaker module 1120. In an embodiment, at least a portion of the second sound channel 1102 connected to the second sound hole 207B may pass through a portion adjacent to the interface 1110.

The speaker module 1120 disposed in the first direction with respect to the interface 1110 may be relatively closer to the first sound hole 207A than the second sound hole 207B. In various embodiments, because the first sound channel 1101 connected to the first sound hole 207A and the second sound channel 1102 connected to the second sound hole 207B are independently provided, an output difference between sounds emitted through the first sound hole 207A and the second sound hole 207B may be small.

The sound channel structure of FIGS. 11A and 11B may be similar to the sound channel structure described with reference to FIGS. 4 to 10. For example, the sound channel structure illustrated in FIGS. 11A and 11B may be understood by replacing the camera module 440 described with reference to FIGS. 4 to 10 with the interface 1110 of FIG. 11B. For example, the sound channel structure illustrated in FIGS. 11A and 11B may be formed by the first support 412 and the second support 413. The first support 412 may include an interface support for supporting the interface 1110 and a speaker support 412A for supporting the speaker module 1120. The second sound channel 1102 may include a space provided between the interface support and the second support 413. Further, the first sound channel 1101 may be connected to the first sound outlet 601 positioned in the first direction with respect to the interface 1110, and the second sound channel 1102 may be connected to a second sound outlet 602 positioned in a second direction with respect to the interface 1110. The first sound outlet 601 may be connected to the first sound hole 207A through the first connection part 801, and the second sound outlet 602 may be connected to the second sound hole 207B through the second connection part 802. Further, a detailed structure of the sound channel of FIGS. 11A and 11B may be understood through the sound channel structure described with reference to FIGS. 4 to 10.

An electronic device (e.g., the electronic device 101 of FIG. 1, the electronic device 200 of FIG. 2A, and the electronic device 400 of FIG. 4) according to various embodiments may include: a camera module (e.g., the camera module 440 of FIG. 5A) including a camera, a speaker module (e.g., the speaker module 450 of FIG. 5B) including a speaker disposed in a first direction with respect to the camera module, a first support (e.g., the first support 412 of FIG. 8A) including a speaker support (e.g., the speaker support 412A of FIG. 8A) configured to support the speaker module, and a camera support (e.g., the camera support 412B of FIG. 8B) configured to support the camera module, a second support (e.g., the second support 413 of FIG. 8A) having at least a portion coupled to the first support, a sound hole (e.g., the sound hole 480 of FIG. 8A) connected to an outside of the electronic device, a first sound outlet (e.g., the first sound outlet 601 of FIG. 8A) positioned in the first direction with respect to the camera module and connected to the sound hole, a second sound outlet (e.g., the second sound outlet 602 of FIG. 8B) positioned in a second direction opposite to the first direction with respect to the camera module and connected to the sound hole, a first sound channel (e.g., the first sound channel 610 of FIG. 8A) connecting the speaker module and the first sound outlet, and a second sound channel (e.g., the second sound channel 620 of FIG. 8B) connecting the speaker module and the second sound outlet, wherein the second sound channel may include a space provided between the camera support of the first support and the second support.

Further, the second sound channel according to various example embodiments may include a groove (e.g., the groove 413-1 of FIG. 8B) concavely formed in at least one of the first support or the second support.

Further, the second sound channel according to various example embodiments may include an airtight member comprising a seal (e.g., the airtight member 640 of FIG. 6) disposed between the first support and the second support.

Further, the second sound channel according to various example embodiments may include a space formed by closing an opening formed in the first support by cover bracket (e.g., the cover bracket 650 of FIG. 9) comprising a metal material.

Further, the speaker support and the camera support of the first support according to various example embodiments may be integrally formed.

Further, the electronic device according to various example embodiments may further include: a display module including a display and a housing (e.g., the housing 411 of FIG. 8A) supporting the display module and receiving the first support and the second support.

Further, the sound hole according to various example embodiments may include a slit-shaped groove formed between the display module and the housing.

Further, the display module according to various example embodiments may include a camera hole (e.g., the camera hole 431 of FIG. 4) configured to receive light incident to a lens of the camera module, and a center of the sound hole may be aligned with the camera hole.

Further, the electronic device according to various example embodiments may further include: a first connection part (e.g., the first connection part 801 of FIG. 8A) formed in the housing to connect the sound hole and the first sound outlet, and a second connection part (e.g., the second connection part 802 of FIG. 8C) formed in the housing to connect the sound hole and the second sound outlet.

Further, the first sound channel according to various example embodiments may include: a passage (e.g., the passage P1 of FIG. 8A) extending obliquely with respect to a third direction perpendicular to the first direction, and the second sound channel may include a passage (e.g., the passage P2 of FIG. 8C) extending parallel to the third direction.

An electronic device (e.g., the electronic device 101 of FIG. 1, the electronic device 200 of FIG. 2A, and the electronic device 400 of FIG. 4) according to various embodiments may include: an interface (e.g., the interface 1110 of FIG. 11B) including a socket connecting to external electronic device, a speaker module (e.g., the speaker module 1120 of FIG. 11B) including a speaker disposed in a first direction with respect to the interface, a first support including a speaker support supporting the speaker module and an interface support supporting the interface, a second support having at least a portion coupled to the first support, a sound hole (e.g., the sound hole 207 of FIG. 11A) connected to an outside of the electronic device, a first sound outlet positioned in a first direction with respect to the interface and connected to the sound hole, a second sound outlet positioned in a second direction opposite to the first direction with respect to the interface and connected to the sound hole, a first sound channel (e.g., the first sound channel 1101 of FIG. 11B) connecting the speaker module and the first sound outlet, and a second sound channel (e.g., the second sound channel 1102 of FIG. 11B) connecting the speaker module and the second sound outlet, wherein the second sound channel may include a space provided between the interface support of the first support and the second support.

Further, the second sound channel according to various example embodiments may include a groove concavely formed in at least one of the first support the second support.

Further, the second sound channel according to various example embodiments may include an airtight member comprising a seal disposed between the first support and the second support.

Further, the second sound channel according to various example embodiments may include a space formed by closing an opening formed in the first support by a cover bracket made of a metal material.

Further, the speaker support and the interface support of the first support according to various example embodiments may be integrally formed.

The electronic device according to various example embodiments may further include a housing having a connector hole configured to receive a connector connected to the interface and receiving the first support and the second support.

Further, the sound hole according to various example embodiments may include: a first sound hole formed in the housing in the first direction with respect to the connector hole and a second sound hole formed in the housing in the second direction with respect to the connector hole.

Further, a distance between the first sound hole and the connector hole and a distance between the second sound hole and the connector hole according to various example embodiments may be the same.

Further, the connector according to various example embodiments may be a USB connector.

Further, the first sound channel according to various example embodiments may include: a passage extending obliquely with respect to a third direction perpendicular to the first direction, and the second sound channel may include a passage extending in parallel with respect to the third direction.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a camera module comprising a camera;
a speaker module comprising a speaker disposed in a first direction with respect to the camera module;
a first support comprising a speaker support configured to support the speaker module and a camera support configured to support the camera module;
a second support having at least a portion coupled to the first support;
a sound hole connected to an outside of the electronic device;
a first sound outlet positioned in the first direction with respect to the camera module and connected to the sound hole;
a second sound outlet positioned in a second direction opposite to the first direction with respect to the camera module and connected to the sound hole;
a first sound channel connecting the speaker module and the first sound outlet; and
a second sound channel connecting the speaker module and the second sound outlet,
wherein the second sound channel comprises a space provided between the camera support of the first support and the second support.

2. The electronic device of claim 1, wherein the second sound channel comprises a groove concavely formed in at least one of the first support or the second support.

3. The electronic device of claim 1, wherein the second sound channel comprises an airtight seal disposed between the first support and the second support.

4. The electronic device of claim 1, wherein the second sound channel comprises a space formed by closing an opening formed in the first support by a cover bracket comprising a metal material.

5. The electronic device of claim 1, wherein the speaker support and the camera support of the first support are integrally formed.

6. The electronic device of claim 1, further comprising:
a display module including a display; and
a housing configured to support the display module and to receive the first support and the second support.

7. The electronic device of claim 6, wherein the sound hole comprises a slit-shaped groove formed between the display module and the housing.

8. The electronic device of claim 6, wherein the display module comprises a camera hole configured to receive light incident to a lens of the camera module, and
a center of the sound hole is aligned with the camera hole.

9. The electronic device of claim 6, further comprising:
a first connection part formed in the housing connecting the sound hole and the first sound outlet; and
a second connection part formed in the housing connecting the sound hole and the second sound outlet.

10. The electronic device of claim 1, wherein the first sound channel comprises a passage extending obliquely in a third direction perpendicular to the first direction, and
the second sound channel comprises a passage extending parallel to the third direction.

11. An electronic device, comprising:
an interface comprising a socket configured to connect with an external electronic device;
a speaker module including a speaker disposed in a first direction with respect to the interface;
a first support comprising a speaker support configured to support the speaker module and an interface support configured to support the interface;
a second support having at least a portion coupled to the first support;
a sound hole connected to an outside of the electronic device;
a first sound outlet positioned in the first direction with respect to the interface and connected to the sound hole;
a second sound outlet positioned in a second direction opposite to the first direction with respect to the interface and connected to the sound hole;
a first sound channel connecting the speaker module and the first sound outlet; and
a second sound channel connecting the speaker module and the second sound outlet,
wherein the second sound channel comprises a space provided between the interface support of the first support and the second support.

12. The electronic device of claim 11, wherein the second sound channel comprises a groove concavely formed in at least one of the first support or the second support.

13. The electronic device of claim 11, wherein the second sound channel comprises an airtight seal disposed between the first support and the second support.

14. The electronic device of claim 11, wherein the second sound channel comprises a space formed by closing an opening formed in the first support by a cover bracket comprising a metal material.

15. The electronic device of claim 11, wherein the speaker support and the interface support of the first support are integrally formed.

16. The electronic device of claim 11, further comprising a housing having a connector hole configured to receive a connector configured to be connected to the interface, the housing configured to receive the first support and the second support.

17. The electronic device of claim 16, wherein the sound hole comprises a first sound hole formed in the housing in the first direction with respect to the connector hole, and a second sound hole formed in the housing in the second direction with respect to the connector hole.

18. The electronic device of claim 17, wherein a distance between the first sound hole and the connector hole and a distance between the second sound hole and the connector hole are the same.

19. The electronic device of claim 16, wherein the connector is a USB connector.

20. The electronic device of claim 11, wherein the first sound channel comprises a passage extending obliquely with respect to a third direction perpendicular to the first direction, and
the second sound channel comprises a passage extending parallel to the third direction.

* * * * *